Feb. 16, 1926.                                                              1,573,555
                        R. S. LEWIS
                      SNUBBING DEVICE
                    Filed April 1, 1924
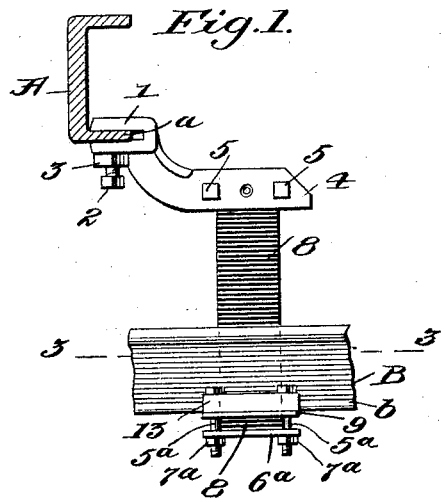
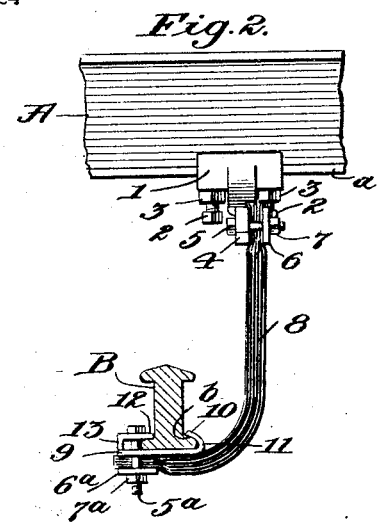
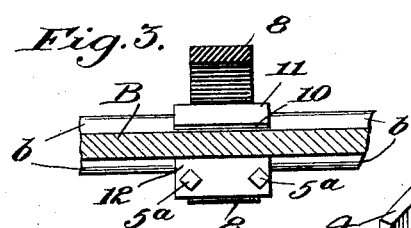
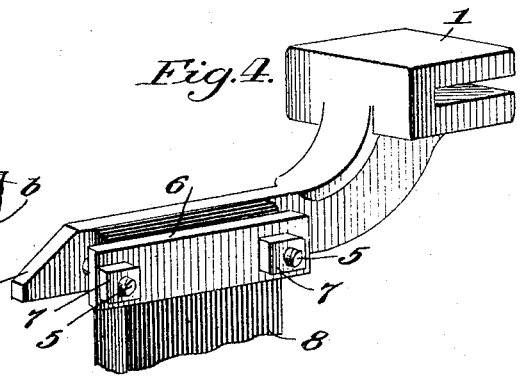
Inventor:
Royal S. Lewis,
by Wm. H. Babcock & Son
    Att'ys.

Patented Feb. 16, 1926.

1,573,555

UNITED STATES PATENT OFFICE.

ROYAL S. LEWIS, OF YAKIMA, WASHINGTON.

SNUBBING DEVICE.

Application filed April 1, 1924. Serial No. 703,499.

*To all whom it may concern:*

Be it known that I, ROYAL S. LEWIS, a citizen of the United States, residing at Yakima, in the county of Yakima and State of Washington, have invented certain new and useful Improvements in Snubbing Devices, of which the following is a specification.

This invention relates to rebound checking or snubbing units and elements thereof and their combination and association with automobile frames and their axles to effectually prevent the abrupt rebounding of the springs and the jar heretofore imparted to the automobile body when traveling over a rough surface, and, of course, prevent the breakage of springs occasioned by such rebounding.

This invention has for its primary objects to provide simple means for attaching an elastic snubbing element to the automobile frame or other part and to the under or lower portion or bottom of the I-beam front axle of the usual passenger automobile to provide the greatest distance between the points of attachment in order to provide for the greatest possible length of single strap snubber in order that the stretching of the snubbing strap may be uniform throughout its length and its length such that the snubbing action will be gradual; to provide a simple, easy, efficient and economical clamp for attaching the strap to the lower part of said axle; to so form said clamp as to guard against any rough or sharp or abrupt angular part thereof, or of said axle, cutting or chafing the active part of said snubbing strap; and to provide means for frictionally adjustably anchoring both ends of said snubbing strap, all of which objects, among others, are accomplished by the construction, combination and arrangement of parts, all as hereinafter more particularly set forth, described and claimed.

In spring rebound checking or snubbing devices relying on the direct tensional resistance of a helical spring or other resilient element, difficulty has been found heretofore because of the character of the snubbing or active checking element employed and the means of attachment used resulting in the snubbing action being either too abrupt, causing rough riding, or was too gradual, resulting in inoperativeness for the purpose in view, this being due largely to the short length of active snubbing element employed, which in turn was due largely to the lack of proper means of attachment, as in the modern automobile the distance between the axle and the frame of the automobile is very short, in a vertical direction.

Bearing these considerations in mind I have sought to find a snubbing or checking element that will be uniform in its resistance to the expansion of the spring throughout the entire body of the snubbing strap from attachment point to attachment point and have selected rubber because of its known characteristics in this regard as fulfilling the requirements of the snubbing element as conceived by me. Next, I have sought to have the two points of attachment as far apart in a vertical direction as possible, recognizing that where the rubber strap is made uniform throughout its length a strap eight inches long, for instance, will stretch twice as far as will a similar strap four inches long before it reaches the limit of its elasticity and so will require a rebound of just twice the distance required for the four inch strap before it reaches the limit of its elasticity. Thus, the longer the strap, the more gradual will be the snubbing or checking action, which starts immediately, but gradually, with the start of the rebound and increases steadily, but gradually, as the rebound progresses and until the rebound is checked. However, it is, of course, essential that the length of the rubber strap shall be such, and its normal tension such, that though its action be gradual to avoid jerks and jars, it will get into action to check the rebound practically with the start of the rebound and will effectually operate to slow up and check the rebound of the spring before the latter passes injuriously beyond its normal condition under load, and to this end the length and thickness of the checking or snubbing straps are so proportioned with relation to the strength of the springs with which they are to be used that said straps in operation will reach their limit of elasticity before said springs rebound to the point of breakage and, in yielding gradually under the influence of the springs in rebounding, will uniformly gradually oppose and slow up such rebounding action, in most instances effectually entirely checking such rebounding before the limit of elasticity of the respective straps is reached.

In the accompanying drawing embodying one form of my invention for purposes of illustration only, it being recognized that in its broader aspects my invention is capable of embodiment in a variety of other and different forms:

Figure 1 represents a rear elevation of a unit embodying my invention as applied to the side channel frame member A, shown in section, and the front axle B, broken away, of a modern passenger automobile;

Figure 2, a side elevation of a unit according to Figure 1 as applied;

Figure 3, a sectional view on the line 3—3 of Fig. 1 looking in the direction of the arrows; and Figure 4, a detail perspective view of the upper bracket and the upper portion of the rubber snubbing strap, broken away.

Referring now in detail to the drawings, A designates the U-shape channel side frame member of the automobile body, said frame member having a lower horizontal part or flange a, and B designates the I-beam front axle of the automobile chassis, said axle having bottom front and rear flanges b, the bottoms of which are flush with, and merge with, the rest of the bottom face of said axle B.

A member having a mouth or slotted end portion 1 receiving in its slot a portion of the flange a of frame member A and held thereto by clamping screws 2 having lock nuts 3 is provided with a preferably integral bracket arm 4 which is perforated to receive two bolts 5 which pass through registering perforations in a clamp plate 6 and receive nuts 7 respectively, which nuts 7 are turned up tight on said bolts 5 respectively to draw said clamping plate 6 toward bracket arm 4 into tight clamping engagement with the intervening material of the upper end portion of the snubbing or checking rubber strap 8. Obviously, when the plate 6 is loosened up, the upper portion of strap 8 may be moved endwise between said bracket arm 4 and said plate 8 to take up slack or relieve tension or put the strap 3 under the desired tension, when the nuts 7 will again be tightened up to clamp the strap 8 tightly when adjusted as desired.

A clamp comprising a plate 9 having its forward edge portion or side portion turned upward and backward so as to form a hook 10 and present a curved lower outer front face 11 and having perforations near its rear edge, and a cooperating fulcrum plate having a holding lip 12 and a fulcrum flange 13 and perforated in registry with the perforations in said plate 9 and a perforated clamping plate 6ᵃ and associated bolts 5ᵃ and nuts 7ᵃ serve to anchor the lower end of the snubbing or checking rubber strap 8 to the bottom of the front axle B.

In arranged relation, as well illustrated in Fig. 2, the plate 9 will be arranged with its hook 10 fitting over the front flange b and will engage the lower face of the axle B and extend to the rear thereof so that its perforations will lie closely adjacent to, but entirely clear of, the rear flange b of said axle, and the fulcrum flange 13 of the fulcrum plate will engage with the upper face of the extreme rear portion of said plate 9 while its lip 12 engages on the upper face of the rear flange b of said front axle B, and the bolts 5ᵃ passing through said fulcrum plate, said plate 9 and clamp plate 6ᵃ on each side, respectively, of the lower end portion of strap 8, serve in two capacities, first, to clamp the rear flange b of axle B firmly between the plate 9 and the lip 12 of said fulcrum plate and, second, to draw the clamp plate 6ᵃ up toward the plate 9 against the intervening material of the lower end portion of the rubber strap 8, so holding the clamp to the lower part of axle B and anchoring said rubber checking or snubbing strap 8 to said clamp beneath said axle B. Also, the material of the strap 8 held compressed between the upper face of clamp plate 6ᵃ and the lower face of plate 9 will act as a resilient cushioning and take-up element for said bolts 5ᵃ. Obviously, when the plate 6ᵃ is loosened up, the lower portion of the strap 8 may be moved endwise between the plate 9 and clamp plate 6ᵃ to take up slack and adjust the tension on the strap 8 as desired, after which the nuts 7ᵃ will again be tightened up to clamp the lower end portion of the strap 8 tightly between the plate 9 and clamp plate 6ᵃ.

Having thus described my invention, what I claim as new and desire to secure by Letters Patent is:

1. In a snubbing unit for attachment to the body and I-beam axle of an automobile, said unit embodying a resilient snubbing strap element connected to the lower part of said axle, anchoring means adapted to be applied to said axle and comprising a hook plate having a hook portion for hooking over one of the bottom flanges of said axle, the said plate in arranged relation extending across under and in engagement with the lower face of said axle, a fulcrum plate having rocking engagement with said hook plate and having a lip for engagement with the upper face of the other bottom flange of said axle, means for drawing and holding the lip of said fulcrum plate toward said hook plate against the intervening flange of said axle, and means for securing said snubbing strap against the face of said hook plate.

2. In a snubbing unit for attachment to the body and I-beam axle of an automobile, said unit embodying a resilient snubbing strap element connected to the lower part of said axle, anchoring means adapted to be applied to said axle and comprising a hook plate having a hook portion for hooking over one of the bottom flanges of said axle, the said plate in arranged relation extending across under and in engagement with the lower face of said axle, a fulcrum plate having rocking engagement with said hook plate and having a lip for engagement with the upper face of the other bottom flange of said axle, a clamp plate located below said hook plate and adapted to clamp upon the intervening material of the lower end portion of said strap to anchor the same, and common means for drawing said fulcrum plate and said clamp plate toward the intervening portion of said hook plate.

3. In a snubbing unit for attachment to the body and I-beam axle of an automobile, said unit embodying a resilient snubbing strap element connected to the lower part of said axle, anchoring means adapted to be applied to said axle and comprising a hook plate having a hook portion for hooking over one of the bottom flanges of said axle, the said plate in arranged relation extending across under and in engagement with the lower face of said axle, a fulcrum plate having rocking engagement with said hook plate and having a lip for engagement with the upper face of the other bottom flange of said axle, means for drawing and holding the lip of said fulcrum plate toward said hook plate against the intervening flange of said axle, and means for securing said snubbing strap against the lower face of said hook-plate, the portion of said hook plate presented toward said snubbing strap intermediate its held end portions being curved and free of abrupt angles to avoid the presentation of an abrupt angular or chafing face to the working portion of said snubbing strap.

4. In a snubbing unit for attachment to the body and I-beam axle of an automobile, said unit embodying a resilient snubbing strap element adapted to be connected to the lower part of said axle, anchoring means adapted to be applied to said axle and comprising a hook plate having a hook portion for hooking over one of the bottom flanges of said axle, the said plate in arranged relation extending across under and in engagement with the lower face of said axle, a fulcrum plate having rocking engagement with said hook plate and having a lip for engagement with the upper face of the other bottom flange of said axle, a clamp plate located below said hook plate and adapted to clamp upon the intervening material of the lower end portion of said strap to anchor the same, said plates all being provided with registering perforations, and bolts extending through the perforations in all of said plates respectively on opposite sides of said intervening portion of said strap and provided with nuts for drawing said fulcrum plate and said clamp plate toward said intervening hook plate.

In testimony whereof, I have signed my name to this specification at Yakima, Washington, this 26th day of March 1924.

ROYAL S. LEWIS.